(12) United States Patent
Stott et al.

(10) Patent No.: US 7,636,317 B2
(45) Date of Patent: Dec. 22, 2009

(54) COMMUNICATIONS TEST SYSTEM WITH MULTILEVEL SCHEDULER

(75) Inventors: L. Noel Stott, Aloha, OR (US); Thomas Alexander, Mulino, OR (US); Ryan McDonough, Beaverton, OR (US)

(73) Assignee: VeriWave, Inc., Beaverton, OR (US)

( * ) Notice: Subject to any disclaimer, the term of this patent is extended or adjusted under 35 U.S.C. 154(b) by 448 days.

(21) Appl. No.: 11/561,833

(22) Filed: Nov. 20, 2006

(65) Prior Publication Data

US 2008/0117810 A1    May 22, 2008

(51) Int. Cl.
*H04L 12/26* (2006.01)
*G06F 13/14* (2006.01)
*G06F 9/455* (2006.01)
*H04W 24/06* (2009.01)

(52) U.S. Cl. .............. 370/241; 370/252; 702/182; 703/21; 717/134; 455/423

(58) Field of Classification Search ................ 370/252, 370/254, 241; 702/182–184; 703/20, 21; 717/134, 135; 455/423
See application file for complete search history.

(56) References Cited

U.S. PATENT DOCUMENTS

| | | | |
|---|---|---|---|
| 5,838,919 A | 11/1998 | Schwaller et al. | |
| 5,881,237 A | 3/1999 | Schwaller et al. | |
| 5,937,165 A | 8/1999 | Schwaller et al. | |
| 6,061,725 A | 5/2000 | Schwaller et al. | |
| 6,397,359 B1 | 5/2002 | Chandra et al. | |
| 6,408,335 B1 | 6/2002 | Schwaller et al. | |
| 6,724,730 B1 | 4/2004 | Mlinarsky et al. | |
| 6,903,910 B1 | 6/2005 | Griesing et al. | |
| 7,006,467 B2 | 2/2006 | Anton, Jr. et al. | |
| 7,215,951 B2 * | 5/2007 | Tanaka et al. | 455/423 |
| 7,277,395 B2 * | 10/2007 | Rosen et al. | 370/241 |
| 7,539,489 B1 * | 5/2009 | Alexander | 455/423 |
| 2003/0069010 A1 * | 4/2003 | Eravelli | 455/423 |
| 2003/0202486 A1 * | 10/2003 | Anton et al. | 370/329 |
| 2005/0166072 A1 * | 7/2005 | Converse et al. | 713/201 |
| 2005/0180444 A1 * | 8/2005 | Gu et al. | 370/412 |
| 2005/0249114 A1 * | 11/2005 | Mangin et al. | 370/229 |
| 2006/0229018 A1 * | 10/2006 | Mlinarsky et al. | 455/67.11 |
| 2008/0026748 A1 * | 1/2008 | Alexander et al. | 455/432.1 |
| 2008/0075055 A1 * | 3/2008 | Chow et al. | 370/338 |

* cited by examiner

*Primary Examiner*—Chi H Pham
*Assistant Examiner*—Ahmed Elallam
(74) *Attorney, Agent, or Firm*—Haynes and Boone, LLP (57) ABSTRACT

Systems and methods are disclosed herein to provide communication testing for wireless or wired packet data communication devices, systems, and networks. In accordance with one embodiment of the present invention, a test system containing a multilevel scheduler is disclosed that includes cascaded schedulers, a software interface, and specific media protocol feedback to accurately emulate multiple clients on a network, with possibly numerous traffic flows per client. Such a test system may offer capabilities such as a more accurate emulation of client contention and collisions, a more accurate emulation of bandwidth sharing between clients, and a more accurate emulation of traffic flow multiplexing between flows.

72 Claims, 7 Drawing Sheets

FIG. 1

(PRIOR ART)

FIG. 2

(PRIOR ART)

FIG. 3

(PRIOR ART)

COMMUNICATIONS TEST SYSTEM WITH MULTILEVEL SCHEDULER

TECHNICAL FIELD

The present invention relates generally to data communication systems and, more particularly, to systems and methods for simulating and testing data communication systems.

BACKGROUND

Packet communications devices, systems, and networks have gained widespread use worldwide. However, they have also become more sophisticated and complex even as they become ubiquitous and crucial to the activities of enterprises and users. Manufacturers, vendors, and users therefore have a greater need for testing such systems; unfortunately, the increasing complexity of such data communication devices and systems makes them harder to test. The recent advent of wireless networks have further multiplied this difficulty, as wireless devices employ more complex connection-oriented stateful protocols running over a contention-based shared radio frequency (RF) medium and often having to support traffic with strict Quality of Service (QoS) guarantees such as voice.

Figure 1:
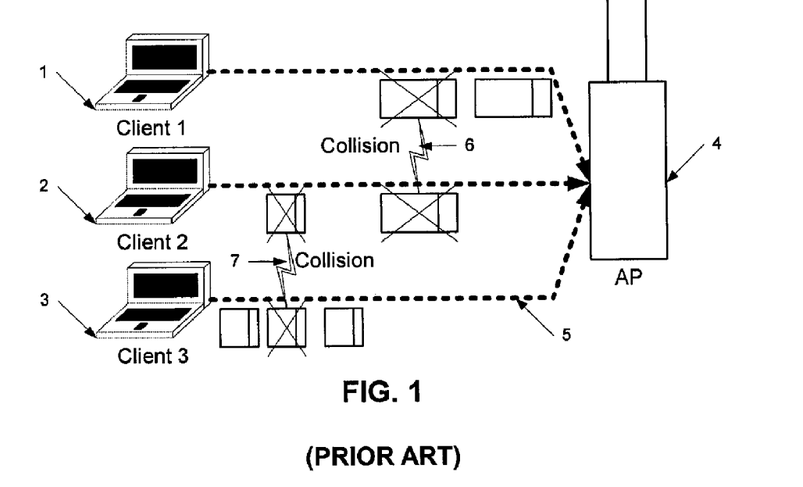
FIG. 1 shows a simplified representation of an exemplary communications network that is to be emulated by a communications test system when generating test data traffic.

With reference to FIG. 1, an exemplary wireless data communications network is represented, consisting of a number of client (user) stations 1, 2, 3 communicating with an access point (AP) 4. Clients 1, 2, 3 share a common RF channel 5, and thus must contend with each other when attempting to transmit packets to AP 4. In some cases two or more of clients 1-3 may even collide when attempting to transmit a packet, such collisions being indicated by 6, 7. Similarly AP 4 must contend with clients 1, 2, 3 for access to the RF channel in order to transmit packets to them, and other collisions may result.

Figure 2:
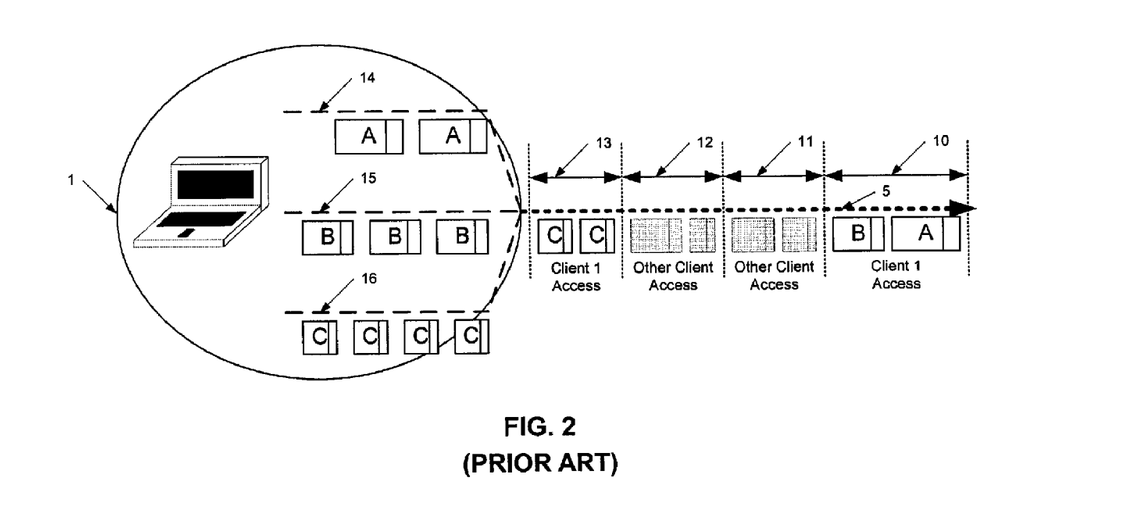
FIG. 2 illustrates the multiplexing of traffic flows within a single client within a communications network.

With reference to FIG. 2, an example of multiple traffic flows supported by a single wireless client 1 is shown. When client 1 gains access to the shared RF channel 5 for a period of time 10 after successfully contending with the other clients 2, 3 that may also desire to gain access, it must then multiplex one or more packets from the traffic flows 14, 15, 16 on to the medium. Other periods of time 11, 12 may be occupied by other clients 2, 3. When client 1 regains access to the medium during time 13, it must make a determination as to which traffic flows are to be transmitted (based on user-specified QoS and bandwidth parameters) and multiplex packets from other traffic flows on to the medium. As a consequence the packet sequence observed on the RF channel may be very complex indeed, and subject to a variety of constraints and protocol functions.

The shared-medium aspect of wireless data communication devices poses a particularly intricate problem in testing. Most wired networks use contention-free switched media of a highly predictable nature, and thus can be tested with relatively simple communication test systems generating fixed, predefined sequences of packets to represent various streams of traffic. Wireless networks, on the other hand, employ contention between clients and access points to regulate access to the shared radio channel, together with random backoff and recovery schemes to mitigate and recover from the effects of collisions between stations. This makes the traffic patterns actually observed on the channel quite unpredictable. Thus wireless data communication devices are not amenable to testing using simple, predefined sequences of packets.

A further complexity is the presence of delay and bandwidth sensitive traffic such as voice and video in modern networks. A communications system carrying such traffic may need to reprioritize or reorder certain packets or sequences of packets in order to meet the QoS requirements of different types of traffic, and ensure that delay and bandwidth guarantees are met. The test systems for such devices and networks will therefore have to generate and analyze traffic conforming to different kinds of QoS requirements in order to properly test them. Again, conventional test systems have difficulty in meeting such requirements.

Yet a further complexity is the need to test traffic flows associated with stateful, connection-oriented protocols. One example of such a protocol, at Layer 2 of the ISO/OSI protocol hierarchy, is the IEEE 802.11 wireless LAN protocol. Another example of such a protocol is the Transmission Control Protocol (TCP), which is at Layer 4 of the ISO/OSI protocol hierarchy. Such stateful protocols can cause some traffic flows to stop and restart unpredictably, as the protocol state machines respond to such network events as mobility (roaming) and congestion, while other traffic flows continue unhindered. As a consequence, not only must the test systems for devices and networks implementing such stateful protocols be capable of generating traffic having these unpredictable characteristics, but these test systems must also be capable of responding correctly to state transitions in the device under test (DUT). Again, conventional test systems have difficulty in meeting such requirements.

Figure 3:
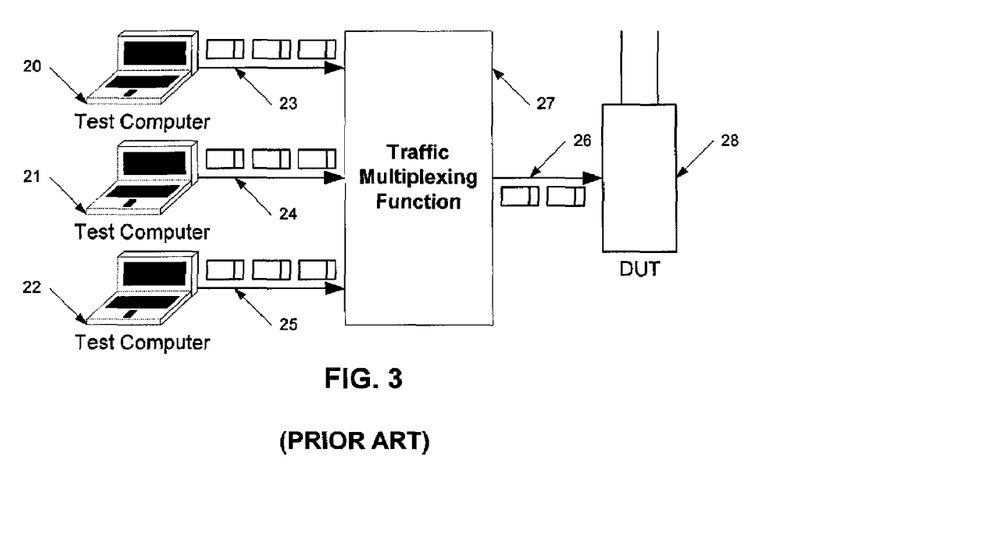
FIG. 3 is a schematic diagram of a prior art communications test system emulating multiple clients with one or more test data traffic flows on each client.

With reference to FIG. 3, an exemplary illustration of one approach heretofore taken in the prior art for creating a communications test system is shown. This may include an array of computers 20, 21, 22 such as laptops, workstations, or embedded computers, that support software programs to generate stateful traffic. Each computer may generate one or more test data flows to represent the different traffic flows normally generated by a real client. The packet data streams 23, 24, 25 generated by the different computers 20, 21, 22, respectively, may be multiplexed into a single stream 26 by multiplexing function 27 and applied to DUT 28. Multiplexing may be done by software or digital logic in the case of wired network test systems, or by arrays of RF combiners and attenuators in the case of wireless network test systems. Contention may be emulated by directly allowing the computers 20, 21, 22 to contend for medium access and even to collide with each other.

Several significant issues are observed with this approach. One is that the use of software programs to generate and multiplex test traffic leads to considerable problems with repeatability and controllability, due to the unpredictable delays and interactions incurred by software. The operating system used on the computers, for instance, significantly affects the behavior of such a test system. Another is that scaling such a system to handle high traffic loads and many clients is expensive and impractical. Yet another is that such systems are complex to configure and manage, especially as the number of computers grows large. Also, the overhead and performance problems incurred by the use of software programs to generate traffic prevents the test system from running at the theoretical maximum capacity of the physical medium, without excessive investment in hardware resources.

Figure 4:
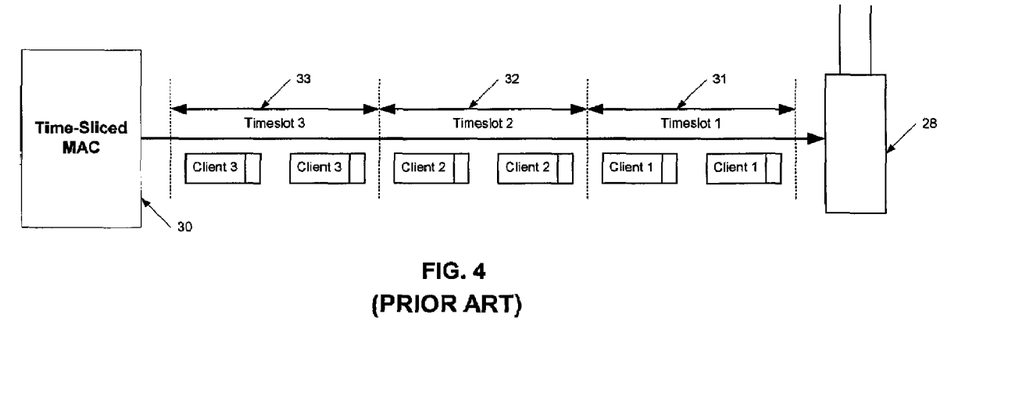
FIG. 4 is a diagram of another prior art communications test system emulating multiple clients using a time-sliced approach.

With reference to FIG. 4, an exemplary illustration of another approach taken in the prior art for creating a communications test system is shown. In this approach, a single Layer 2 Medium Access Control (MAC) device 30 is time-sliced into predetermined slots 31, 32, 33 to create the effect of multiple 'virtual' clients; each temporal slot may represent a different client. When a slot is active, the corresponding virtual client is permitted to send and receive traffic, and all other clients are usually effectively deactivated. Over a period of time, the effect observed is that of a number of different clients sharing a single medium and transmitting and receiving packets to/from DUT 28. Time-slicing may occur using hardware, firmware or software logic, and the protocol stacks of individual clients may likewise be supported using hardware, firmware, or software.

This approach, too, suffers from significant issues. The traffic generated by this method does not resemble real communications data traffic. Firstly, as only one client is active during each time slot, it is impossible to emulate contention or collisions. Secondly, a client cannot respond to traffic directed to it from the DUT when its timeslot is not active; unlike a real client, it will have to wait until its turn to transmit responses back to the DUT. Thirdly, the timeslots are fixed in duration and do not reflect the changing bandwidth and latency parameters of real network traffic, particularly those with QoS requirements. Finally, creating and assigning a pattern of timeslots is an intensive and time-consuming process; thus, if a client connection is dropped or a new client connection is set up, it is difficult or impossible to modify the timeslot pattern in order to change the bandwidth assignments of the other clients to compensate.

Note that the above mentioned issues and requirements pertain to wired as well as wireless communications test systems. Heretofore, these issues and requirements have not received much attention in wired test systems because of the relatively predictable nature of wired network data traffic at ISO/OSI Layers 3 and below, where much of the testing has been focused. In addition, testing QoS functions for wired data traffic has hitherto not received much attention. However, with the increasing emphasis on testing stateful, connection-oriented higher layer protocols (Layer 4 and above) and the increasing need for QoS in data communication networks, it is important to create data communication test systems capable of dealing with such issues.

Accordingly, there is a need for improved data communication test techniques. A test system that can emulate the behavior of multiple stations or clients contending for a shared medium or channel in a controllable and repeatable manner may be desirable. Further, such a test system may preferably emulate the behavior of stateful, connection-oriented protocols at various protocol layers. Also, such a test system may emulate multiple traffic streams with different QoS requirements on each client. It is also desirable for the test system to be able to efficiently scale to large numbers of emulated clients and flows in a practical manner.

SUMMARY

Systems and methods are disclosed herein that may provide improved test techniques for data communication devices, systems, and networks. Such test techniques may enable the improved generation and analysis of multiple flows of packet data traffic appearing to originate from, or terminate on, a plurality of endstations or clients. Further, the test techniques may facilitate the repeatable and efficient emulation of stateful clients supporting flows with strict QoS requirements.

In accordance with an embodiment of the present invention, a multilevel packet scheduler is disclosed that may combine schedulers, context memory, control interfaces, and a MAC interface. The multilevel packet scheduler may enable the accurate emulation of multiple clients accessing a physical or logical medium, possibly including the effects of the clients contending for the medium, and possibly also including the effects of collisions during contention. Further, the multilevel packet scheduler may enable each of the emulated clients to support multiple different packet flows, each packet flow possibly having a different QoS requirement. The resulting implementation of the multilevel packet scheduler in a data communications test system may provide extremely accurate flow scheduling and client emulation.

More specifically, in accordance with an embodiment of the present invention, a multilevel packet scheduler may include a client scheduler, a flow scheduler, context memories for the schedulers, a control interface for software configuration and control, MAC logic, packet injection logic for a local CPU, and control logic to enable start/stop of clients and flows, either singly or in groups. Feedback control signals may be provided between elements of the multilevel packet scheduler to enable interactions between the entities representing the various protocol layers in an accurate and repeatable manner.

In accordance with an aspect of the present invention, the client and/or flow schedulers used in the multilevel packet scheduler may be comprised of prioritized deadline schedulers. A prioritized deadline scheduler may contain a context memory, an insertion and search engine, insertion context registers, group start/stop logic with FIFO buffering, a real-time clock counter, and control and configuration interfaces. The context memory may hold deadline and priority information for each supported client or flow that may enable the insertion and search engine to perform tasks required for scheduling and update.

Another aspect of the present invention may enable the accurate emulation of contention behavior of real clients by detecting when two or more clients being emulated by the test system are scheduled to transmit at the same time, and performing appropriate contention resolution and backoff functions as may be stipulated by the MAC protocol. A further aspect of the present invention may enable the accurate emulation of collision behavior of real clients by detecting such contention and generating traffic similar to that which would be observed upon a collision of real clients. This aspect of the invention may further include a configurable collision probability.

In accordance with another aspect of the present invention, a start/stop mechanism may be provided in conjunction with the multilevel packet scheduler to allow the starting and stopping of one or more clients, one or more flows, or both. The start/stop mechanism may further enable the synchronized starting or stopping of groups of flows (or clients) on multiple instances of multilevel packet schedulers simultaneously. A further aspect of the invention may enable the staggered starting of flows or clients within a group, in a controlled manner, for example in cases where it is desired to progressively increase the load on the DUT.

BRIEF DESCRIPTION OF THE DRAWINGS

The features and embodiments of the present invention, and their advantages, are best understood from the detailed description set forth below when taken in conjunction with the drawings, wherein.

It should be understood that, in the description following hereinafter, like reference numerals are used to identify like elements illustrated in one or more of the above drawings.

DETAILED DESCRIPTION

Figure 5:
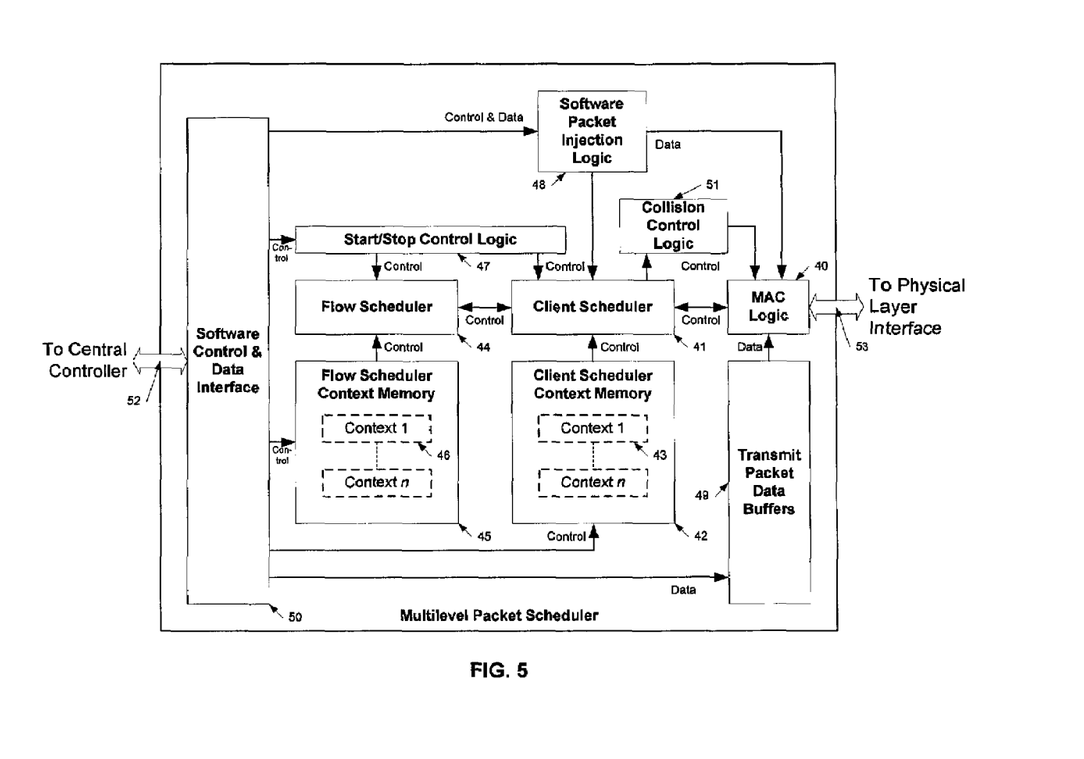
FIG. 5 shows an exemplary block diagram of a communications test system interface in accordance with an embodiment of the present invention.

FIG. 5 shows a block diagram illustrating a single port of a communication test system containing a multilevel packet scheduler in accordance with an embodiment of the present invention. The multilevel packet scheduler may enable the effective emulation of a plurality of independent clients, either wired or wireless. As depicted in FIG. 5, the multilevel packet scheduler may include a MAC logic block 40 operatively coupled to a first level (client) scheduler 41 as well as an external PHY (Physical Layer) interface unit via interface 53. The client scheduler may obtain its parameters from a client scheduler context memory 42 containing a plurality of contexts 43. The client scheduler in turn may be operatively coupled to flow scheduler 44, which may likewise be associated with flow scheduler context memory 45 containing another plurality of contexts 46. Individual client and flow contexts may be enabled and disabled under the control of start/stop control logic 47 acting upon the client and flow schedulers. Traffic flow packet data may be obtained by MAC logic 40 from transmit packet data buffers 49 (which can simply be a memory containing a number of packet buffers preformatted with packet information under software control).

A software program running on a central controller may also be allowed to inject packets into the outgoing packet stream placed by MAC logic 40 on PHY layer interface 53; this may be facilitated by software packet injection logic 48 operatively coupled to client scheduler 41 (for control purposes) and MAC logic 40 (for data transfer purposes). Contention and collisions between clients may be produced by means of collision control logic 51, which may be operatively coupled to client scheduler 41 as well as MAC logic 40, obtaining control inputs from the former and generating collision control signals to the latter. Overall control and coordination of the system, as well as buffer and context initialization and software packet buffer injection, may be carried out via software control and data interface 50 which may couple to an external central controller or control CPU via bus 52.

The general operation of the arrangement of FIG. 5 is relatively straightforward. The external central controller may initialize the system and set up at least one client context 43 in client scheduler context memory 42. In addition the central controller may set up at least one flow context 46 in flow scheduler context memory 45. Further, it may preformat one or more packets into transmit packet data buffers 49, associating flow contexts 46 with packet buffers on a one-to-one, one-to-many or many-to-one basis. Once configured, the central controller may then cause the schedulers to begin operation by means of a command issued to start/stop control logic 47.

The system, in operation, may therefore emulate a plurality of traffic flows running on a plurality of contending clients, multiplexing all of the traffic on to PHY interface 53. Operation may follow a regular and repeating sequence. The client scheduler 41 operates first, and may act to select one of the plurality of client contexts 43 which may be configured into client scheduler context memory 42. This client context is then presented to MAC logic 40, which may act to determine when, according to the MAC protocol requirements, the selected client is allowed to transmit. At that time, flow scheduler 44 may receive an indication from client scheduler 41, and may be responsive to select a specific flow belonging to the selected client for which at least one packet may be actually enabled to transmit. The selected flow may then be mapped to the associated packet buffer or buffers, and this indication may be passed to MAC logic 40, which may read the buffer and pass it to the external PHY via interface 53.

It is apparent from the above that the multilevel packet scheduler may be used to implement at least a two-level hierarchy of packet traffic management, for example in the case of wireless LANs, which may employ a shared-medium protocol. At the first level, wireless clients are scheduled on to the common physical medium or channel, and contention between clients resolved in a manner that may emulate that of real clients. At the second level, traffic flows are scheduled on each client, in a manner that may emulate the traffic flow multiplexing performed by real clients. It should be appreciated that this approach is not limited to two levels of hierarchy, but may be extended to three or more levels of hierarchy, as dictated by the nature of the test system to be created and the traffic to be emulated.

If one or more active flows (and/or clients) are desired to be stopped, a suitable command may be passed to start/stop logic 47 by the central controller. Start/stop logic 47 may then cause flow scheduler 44 and/or client scheduler 41 to deactivate the appropriate context or contexts in flow scheduler context memory 45 and client scheduler context memory 42. Once a context is deactivated, the respective scheduler may refrain from scheduling it for enabling packet transmission until reactivated.

It is sometimes necessary for the software running on the external central controller to inject packets into the outgoing transmit packet stream on behalf of a specific client; for example, when performing the IEEE 802.11 authentication and association functions. One or more packets for an active client may be passed to software packet injection logic 48, which may buffer them internally until the corresponding client context 43 is selected for packet transmit by client scheduler 41. At this time, software packet injection logic 48 may notify client scheduler 41 of the existence of software-generated packets, in which case client scheduler 41 may elect to avoid notifying flow scheduler 44 but instead signal MAC logic 40 to accept one or more packets directly from software packet injection logic 48. Packets for multiple active clients may be queued to software packet injection logic 48, which may match each client context 43 selected in turn by client scheduler 41 against its internal packet queues, and may therefore buffer and process software injected packets for many different client contexts concurrently.

Client scheduler 41 may use the parameters written to contexts 43 in client scheduler context memory 42 to schedule each emulated client completely independently of all other emulated clients. Under these circumstances, it is possible that two or more emulated clients may be scheduled to be active at the same time, thereby contending for access to the physical medium exactly as if they were real clients. Contention in this manner may be detected by collision control logic 51, which may elect to convert the contention into an emulated collision by signalling MAC logic 40 to generate a collision fragment signal on the PHY medium (via PHY interface 53) and may further cause client scheduler 41 to perform the protocol-specific backoff procedure on all of the contending clients.

Figure 6:
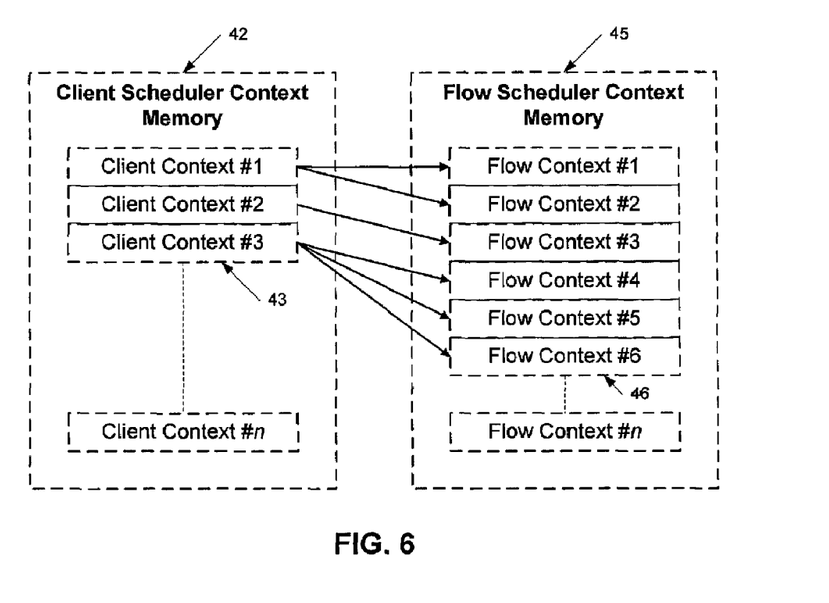
FIG. 6 illustrates one possible logical organization of the scheduler context memory of a 2-level scheduler in accordance with an embodiment of the present invention.

Turning now to FIG. 6, an exemplary logical representation of the relationship between a plurality of client contexts 43 in client scheduler context memory 42, and a plurality of flow contexts 46 in flow scheduler context memory 45 is depicted. It will be appreciated that this diagram is merely representative and the actual mapping between clients and flows may be arbitrarily modified as required to emulate a desired configuration. As shown in the figure, context #1 of the plurality of client contexts 43 maps to contexts #1 and #2 of the plurality of flow contexts 46. What this might mean in actual operation of the multilevel scheduler is that when client #1 is first selected for transmit (as indicated by the selection of context #1 to become active, by client scheduler 41), then flow context #1, may subsequently be selected by flow scheduler 44, and one or more packet buffers assigned to flow context #1 may be enabled to be transmitted by MAC logic 40. When client #1 is next selected for transmit, then flow context #2 may subsequently be selected this time, and one or more packet buffers assigned to flow context #2 may be enabled to be transmitted. A similar procedure may be carried out for the other emulated clients, as indicated by the mappings from the other client contexts to the other flow contexts. At any instant, the specific client and flow selected for transmit may be selected on the basis of traffic bandwidth parameters written into contexts 43 and 46 by software.

Figure 7:
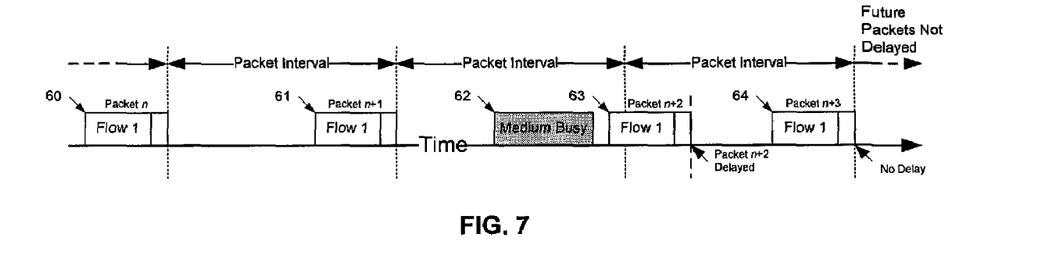
FIG. 7 illustrates a constant bandwidth scheduling effect that maintains a fixed bandwidth level in spite of the perturbing effects of contention in accordance with an embodiment of the present invention.

FIG. 7 gives an exemplary representation of one possible scheduling discipline, referred to hereinafter as constant-bandwidth scheduling. In this situation, it may be desired to transmit packets at a constant average rate per traffic flow, in spite of delays and irregularities that may occur in accessing the medium as a consequence of the half-duplex nature of the protocol. In order to maintain a constant average rate, therefore, it may be necessary to compensate for a momentary delay by reducing the interval between packets (and thus increasing the instantaneous bandwidth) until the effect of the delay has been 'made up', and packet transmission can resume a regular schedule.

In FIG. 7, a stream of packets 60, 61, 63, 64 is transmitted by the multilevel scheduler at regular intervals (referred to as the packet interval). However, it may happen that the medium may be busy during a time 62 that prevents a packet 63 from being transmitted at the normally scheduled time. In this case, packet 63 may be transmitted as soon as permitted by the rules of the medium access protocol, but is nevertheless subject to a delay. The delay may then be compensated for by transmitting the next packet 64 not at a fixed time from packet 63, but instead a fixed time from when packet 63 was supposed to have been transmitted. It should be appreciated that if the medium-busy duration is such that packet 63 is delayed for a large amount of time, it may happen that packet 64 is delayed as well, and compensation may begin occurring at the next packet, and so on.

Effectively, a constant-bandwidth scheduler may maintain a virtual clock that indicates the desired transmission time of each packet. If it is not possible to transmit a specific packet exactly at the instant indicated by the virtual clock due to some delay, then it may instead be transmitted as soon as possible, but the delay in a given packet may be kept from affecting future packets. Constant bandwidth scheduling is appropriate for situations where a specific bandwidth is desired but the delay between packets is of little significance. Examples of such situations are video streams and fixed-bandwidth data transfers.

Figure 8:
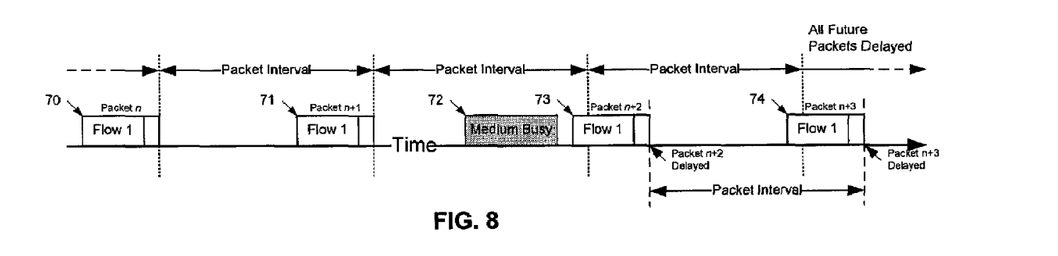
FIG. 8 illustrates a constant interval scheduling effect that maintains a fixed minimum gap between packets in spite of the perturbing effects of contention in accordance with an embodiment of the present invention.

Another possible scheduling discipline, referred to hereinafter as constant interval scheduling, is represented in an exemplary fashion by FIG. 8. In constant interval scheduling, the average bandwidth of the flow may not be of much interest, but the interval between packets is desired to remain as nearly constant as possible, and not fall below the specified minimum interval. In FIG. 8, a stream of packets 70, 71, 73, 74 is represented, with a medium-busy period at 72. As in the previous instance, medium-busy period 72 causes packet 73 to be delayed, but unlike the previous instance, the interval between packets 73 and 74 may not be reduced to compensate; instead, the interval may be kept constant and the whole subsequent packet stream shifted. The effect is that of a constant-packet-interval traffic stream, which may be useful in representing the medium access behavior of standard VoIP handsets.

Figure 9:
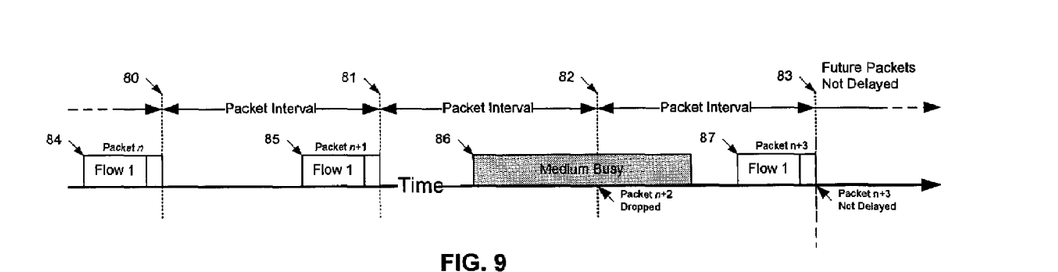
FIG. 9 illustrates a constant latency scheduling effect that maintains a fixed end-to-end packet latency in spite of the perturbing effects of contention in accordance with an embodiment of the present invention.

Yet another possible scheduling discipline, referred to herein after as constant latency scheduling, is represented in an exemplary fashion by FIG. 9. In this mode of scheduling, neither the average bandwidth nor the interval between packets is of much interest, but if a transmission point for a packet is missed (possibly by some predefined threshold) then it may be desired to drop the packet completely, and proceed instead to transmitting the next packet at the next intended transmission point. With reference to FIG. 9, a series of intended packet transmission points 80, 81, 82, 83 is represented, separated by possibly constant packet intervals. At intended transmission points 80, 81, packets n and n+1 may be transmitted on time without difficulty. However, subsequent to one of the transmission points (81 in this example), the medium may become busy as illustrated by 86, due to other transmissions or interference, and the busy period may last for a substantially long time, well beyond the transmission point for packet n+2. In this event, packet n+2 is simply dropped (not transmitted), and transmission resumes with packet n+3 at 87. It will be apparent that no packets are delayed, and hence the end-to-end latency as measured under such a system may be constant, even though the actual number of packets transmitted may vary with the medium congestion situations. Such a scheduling discipline may be useful in representing traffic streams such as packetized voice generated by VoIP handsets, which may elect to drop packets rather than suffer problems due to variable latency.

It may also be possible to combine the beneficial effects of two or more scheduling disciplines. For example, combining the constant bandwidth and the constant latency scheduling disciplines together with a user-settable delay threshold may result in a scheduling discipline wherein packets are allowed to be delayed due to medium congestion up to the user-settable threshold, after which they are dropped. The result may enable even better emulation of the medium access and traffic generation behavior of a VoIP handset.

Figure 10:
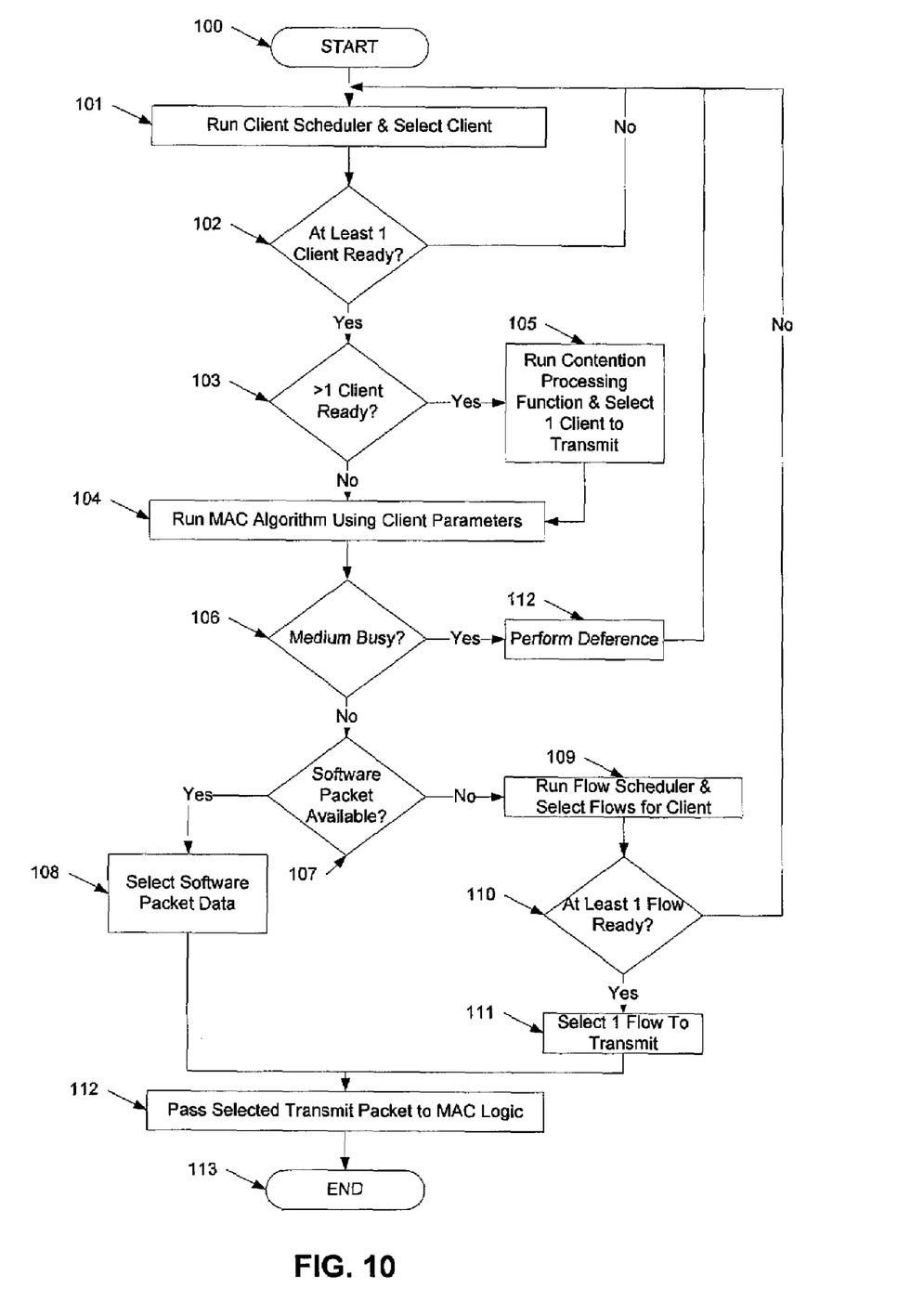
FIG. 10 depicts an exemplary flow chart of a general 2-level scheduling algorithm in accordance with an embodiment of the present invention.

With reference to FIG. 10, an exemplary flowchart illustrating a possible operational behavior of the multilevel scheduler is shown. This process may include:

(a) at block 100, beginning the process of selecting and scheduling a packet;

(b) at block 101, running the client (first level) scheduler, to select a specific client;

(c) at block 102, determining if at least one client is ready to transmit, as indicated by a count of ready clients being 1 or more, and, if no ready clients are found, returning to block 101;

(d) at block 103, determining if more than 1 client is ready to transmit;

(e) at block 105, if more than 1 client is ready to transmit, performing a contention processing function and selecting 1 client for actual transmission (plus possibly including collision processing);

(f) at block 104, executing the medium access control (MAC) algorithm to orchestrate access to the medium by the selected client according to the requirements of the MAC protocol and the parameters of the selected client;

(g) at block 106, checking if the medium is busy;

(h) at block 112, if the medium is found to be busy, performing a deference process according to requirements of the MAC protocol and the parameters of the selected client, and returning to block 101 to select a client anew;

(i) at block 107, checking to see if a packet generated for that client under software control by the central controller (hereinafter referred to as software packets) is available to be transmitted;

(j) at block 108, if a software packet is available, then selecting its packet data for transmission;

(k) at block 109, if no software packet is available, then attempting to select a traffic flow packet instead for transmission, by running the flow (second level) scheduler to select the traffic flow or flows that may be ready to transmit for the selected client;

(l) at block 110, checking to see if at least one flow was selected in block 109, and, if no flows were selected, returning to block 101 to repeat the process;

(m) at block 111, if more than one flow was selected in block 109, then picking one of the selected flows, and then selecting the next packet that is to be transmitted for that flow;

(l) at block 112, actually transmitting the packet selected in either of blocks 108 or 111, by passing the packet data to the MAC logic for transmission; and (m) at block 113, terminating the process of scheduling and selecting a packet, preparatory to performing any other tasks prior to resuming the process at block 100.

Figure 11:
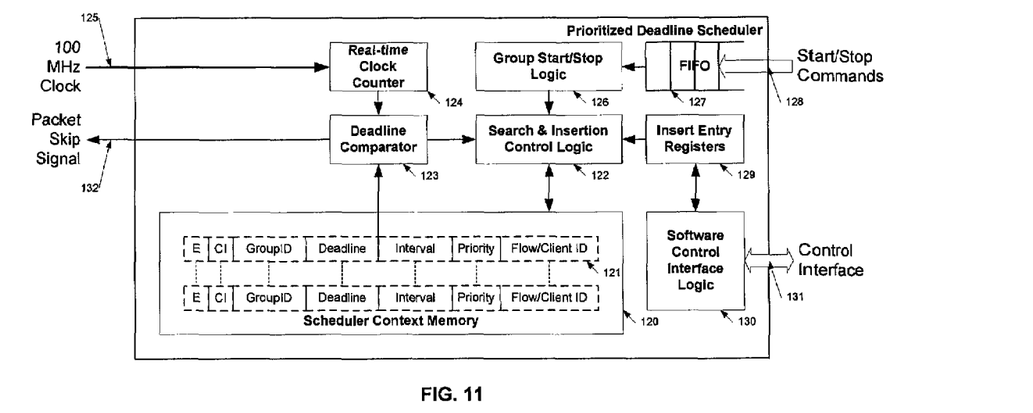
FIG. 11 shows an exemplary block diagram of a prioritized deadline scheduler in accordance with an embodiment of the present invention.

Turning now to FIG. 11, an exemplary block diagram of an implementation of the client (or flow) scheduler is shown. It should be appreciated that the operation of the two schedulers is much alike, in that they sequentially select a single client (or flow) for transmission out of a pool of candidate clients (or flows), and the two schedulers may therefore have the same structure, though this is not necessary. For example, the start/stop capability may be omitted from the client scheduler for simplicity, and only the flows may be started and stopped (in which case the client scheduler runs continuously). As another example, the priority field may be omitted from the client scheduler, in which case all clients are required to have the same priority of medium access but the client scheduler may be simplified.

With respect to FIG. 11, a scheduler context memory 120 may hold a plurality of contexts 121, each context containing at least a client (or flow) identifier (ID) and a deadline, and possibly also including a priority, a group ID, an interval, a constant-interval flag (labeled as CI), and an enable flag (labeled as E). The deadline field may determine the next scheduling deadline for context 121, i.e., the future point in time at which context 121 becomes active. The priority field may determine the scheduling priority of context 121 relative to other contexts, and may further be used to cause higher-priority clients (or flows) to be scheduled in preference to lower-priority clients (or flows). The group ID may denote an identifier assigned to a group of clients (or flows), and may further be used to allow the starting or stopping of such groups in unison. The interval may denote a time interval between successively scheduled packets for the client (or flow) represented by context 121, while the CI flag may indicate (if set) that a constant-interval mode of operation as illustrated in FIG. 8 is desired. Finally, the enable flag (E) may indicate whether the client (or flow) is enabled for operation or not; if clear, it may indicate that the client (or flow) should not be scheduled at all, regardless of the programmed deadline or priority. Group start/stop logic 126 may toggle the state of one or more enable flags in one or more contexts 121, responsive to start/stop commands as described below.

Context memory 120 may be operatively coupled to search and update logic 122, which may perform the insertion, modification, deletion and scanning of the contexts 121, when new entries are added, scheduled entries are updated, unwanted entries are removed, or a client (or flow) must be scheduled, respectively. Context memory 120 (specifically, the deadline portion of contexts 121) may further be operatively coupled to deadline comparator 123, which may compare the deadlines read out of context memory 120 with the output of real-time clock counter 124. Real-time clock counter 124 increments at a uniform rate, possibly driven by fixed-frequency clock pulses, such as the 100 MHz clock pulses provided by clock signal 125. The output (not shown) of search and update control logic 122 to the remainder of the multi-level packet scheduler may include an indication of which client (or flow) is selected for transmission, and may further include the number of clients that are contending for transmission at the same time.

Group start/stop logic 126 may accept start/stop commands from interface bus 128 and buffered by FIFO 127, and may instruct search and update control logic 122 to enable or disable one or more contexts 121, possibly by the operation of toggling the enable flags. Starting a context may be represented by an enabling of the context, allowing it to be scanned during the scheduling process. Stopping a context may conversely be represented by a disabling of the same, preventing it from being considered during the scheduling process. Starting a group with a given ID may thus be accomplished by enabling all contexts 121 within context memory 120 that are assigned that group ID. Similarly, stopping a group may be accomplished by disabling all contexts 121 within context memory 120 that are assigned that group ID. The presence of a separate group ID field in each of the contexts 121 within context memory 120 may enable each context 121 to be given a different value of group ID, i.e., be assigned to a different group. Therefore, it may be possible to enable or disable different subsets of the contexts, and thus the clients (or flows), represented by different group IDs, with a single command. Further, the enable and/or disable process can be carried out within a very short time (as it involves merely setting or clearing a flag) and thus may enable start/stop of test flows with no impact on the remainder of the test traffic. It will be apparent that group start/stop may be applied to clients, to flows, or to both.

A constant-latency scheduling mode may be implemented with the aid of packet skip signal 132 operatively coupled to MAC logic 40. In support of this mode, deadline comparator 123 may further determine the degree to which the deadline field in context 121 has fallen behind real-time clock counter output 124. If the deadline has fallen behind by some predefined threshold (for example, by the value of the interval field for the same context 121) then deadline comparator 123 may assert packet skip signal 132. This may in turn signal to MAC 40 that one or more packets are to be skipped because they have missed their assigned deadlines by delays exceeding the predefined threshold.

Software control interface logic 130 may be operatively coupled to insert entry registers 129, and may function in such a way as to accept commands from control interface 131 coupled to a central controller, and convert them to commands to insert, delete, or modify contexts 121 present in context memory 120, or to read back the contents of one or more such contexts.

Figure 12:
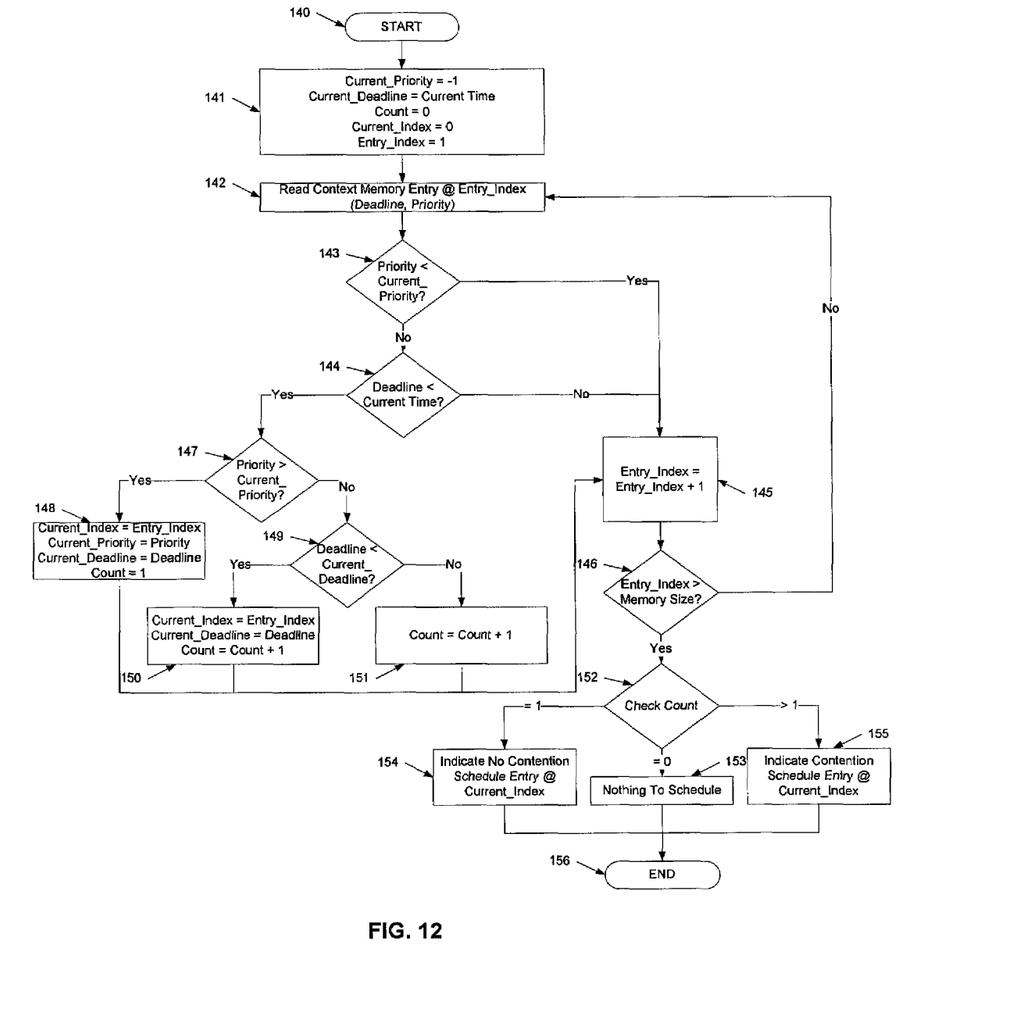
FIG. 12 depicts an exemplary flow chart of a prioritized earliest deadline first scheduler algorithm in accordance with an embodiment of the present invention.

Turning now to FIG. 12, a flowchart illustrating a possible realization of the scanning process of a prioritized earliest deadline first scheduler algorithm is depicted, wherein a specific client (or flow) may be selected for transmit according to the parameters configured into contexts 121 within context memory 120, as well as the present value of real-time clock counter 124. A set of local variables are assumed, which may include: the priority of the currently selected entry (Current_Priority), the scheduling deadline for the currently selected entry (Current_Deadline), the number of matching entries (Count), the index of the currently selected entry (Current_Index), and the index of the entry being scanned (Entry_Index). The algorithm may include:

(a) at block 140, starting the process of scanning the contexts 121 in context memory 120;

(b) at block 141, initializing the local variables (Current_Priority, Current_Deadline, Count, Current_Index, and Entry_Index);

(c) at block 142, reading out the contents of context 121 selected by Entry_Index;

(d) at block 143, checking if the priority of context 121 is less than Current_Priority;

(e) at block 144, if the priority is less than Current_Priority, further checking if the deadline of context 121 is less than the current time indicated by real-time clock counter 124;

(f) at block 145, if the priority check or the deadline check fails, then incrementing Entry_Index;

(g) at block 146, checking if Entry_Index now exceeds the total number of active contexts 121 in context memory 120, and, if not, repeating the scan starting at block 142;

(h) at block 147, as the priority and deadline checks have passed, checking if the priority of context 121 is greater than Current_Priority;

(i) at block 148, as a context 121 with higher priority has been found, substituting this context for the originally referenced context, and setting Count to 1;

(j) at block 149, checking if the deadline in context 121 is less than Current_Deadline;

(k) at block 150, if the deadline is less, substituting this context for the originally referenced context, and incrementing Count;

(l) at block 151, simply incrementing Count, without making any substitution;

(m) at block 152, as all contexts 121 have been scanned, checking the value present in Count;

(n) at block 153, if Count is found to be zero, indicating to the remainder of the multilevel packet scheduler that there is no client (or flow) ready to transmit;

(o) at block 154, if Count is found to be 1, indicating that there is no contention (exactly 1 client (or flow) is found to be ready to transmit) and indicating that the client (or flow) with index Current_Index should be scheduled;

(p) at block 155, if Count is found to be greater than 1, indicating that contention exists, and further indicating that the client (or flow) with index Current_Index should be selected for any packet transmission; and (q) at block 156, terminating the scanning process in preparation for a possible update of the context entry and a repeat of the scanning process afresh at block 140.

It will be appreciated that the flowchart represented in FIG. 12 may be used to determine whether any clients (or flows) are ready to transmit data, whether contention is occurring, and to select a specific client (or flow) to provide packet data to be transmitted. In the case of contention, a further process may be implemented by collision control logic 51 shown in FIG. 5 to determine if a collision should be forced, or if the contention may be resolved without collision, i.e., the selected client (or flow) may be successfully transmitted and other contending clients (or flows) may be rescheduled for a future attempt.

It will further be appreciated that the time taken to scan all of the context entries 121 in context memory 120 sets an upper bound on the packet rate achievable by the packet scheduler. For example, assuming that 100 entries exist in context memory 120, and one entry is scanned every 6 nanoseconds, then all entries in context memory 120 will have been scanned in 600 nanoseconds, and the next candidate client (or flow) located, no matter which entry it happens to be. As the minimum inter-packet interval for Gigabit Ethernet is 672 nanoseconds, this rate of scanning may be sufficient for the multilevel packet scheduler to support the needs of Gigabit Ethernet. It is therefore possible for a linear search scheme to be used in the interests of simplicity.

It will be apparent to persons skilled in the art that the scanning process may be carried out in parallel, by reading back and checking multiple context entries 121 at one time (for example, 8) and by pipelining the scanning of context entries in such a way that the reading, checking and decision making processes are staged (for example, using a 3-stage pipeline). It will be apparent to persons skilled in the art that parallelization and pipelining of the scanning process may enable it to be extended to any arbitrary packet rate that is desired to be supported.

Figure 13:
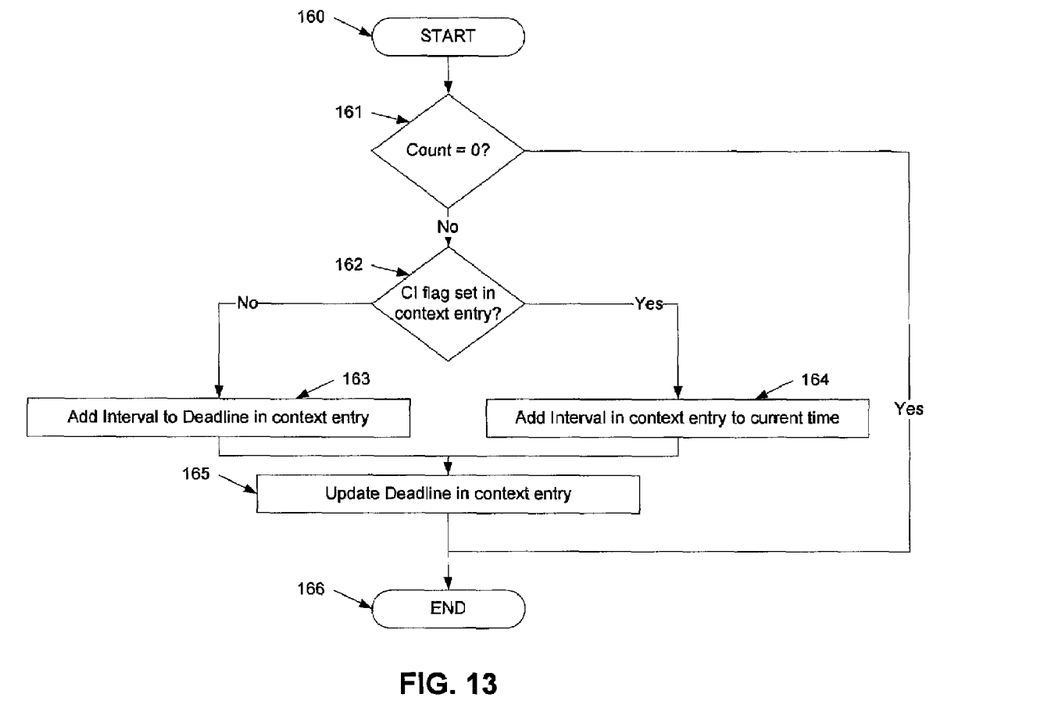
FIG. 13 represents an exemplary flow chart of an update algorithm for a prioritized earliest deadline first scheduler in accordance with an embodiment of the present invention.

With reference to FIG. 13, an exemplary flowchart of an update process for a selected context entry 121, which may be performed after the scanning process that may be represented by FIG. 12 has been completed. The update process may update the contents of a context entry 121 after it has been scheduled, in preparation for the next scheduling scan cycle. As seen from the figure, the update process may be provided with the information obtained during the scanning process, including the current time from real-time clock counter 124 and the contents of context 121, and may include:

(a) at block 160, starting the update process;
(b) at block 161, checking whether at least one context 121 was selected during the scanning process, and skipping the update if not;
(c) at block 162, checking whether the CI flag is set in the context;
(d) at block 163, if the CI flag was not set, which may indicate a constant-bandwidth client (or flow), adding the Interval field in the selected context to the Deadline field;
(e) at block 164, if the CI flag was set, which may indicate a constant-interval client (or flow), adding the Interval field in the selected context to the current time;
(f) at block 165, updating (writing back) the new value of the next deadline as calculated from either block 163 or block 164 to the Deadline field in the selected context; and
(g) at block 166, completing the process of updating the context entry.

It will be appreciated that a delayed start effect may be obtained for a specific client (or flow) by setting the initial value of the deadline stored in context 121 for that client (or flow) to a non-zero value. In this case, the client (or flow) scheduler may initially determine as a result of executing the scanning algorithm depicted in FIG. 12 that the client (or flow) is not ready to transmit, and may continue to determine this until the initial value of the deadline has been passed. Once the initial value has been passed, and the client (or flow) has been scheduled, then the deadline may be updated from the interval value and future scheduling instances of the client (or flow) occur in the normal fashion.

It will also be appreciated that the delayed start effect may be extended to support a staggered start effect, by initializing different initial values of the deadlines stored into the various contexts 121. The client (or flow) with the lowest initial deadline will start first, followed by the client (or flow) with the next value of deadline, and so on. This may enable clients (or flows) to be started in sequence with an arbitrary but predefined time in between the starting of one client (or flow) and the starting of the next. The predefined time between the starting of the client (or flow) may be controlled by software executed on the external central controller, by providing a register within software control and data interface 50 of FIG. 5, and utilizing the contents of this register as an offset that is added to successive contexts 121 as they are initialized.

Figure 14:
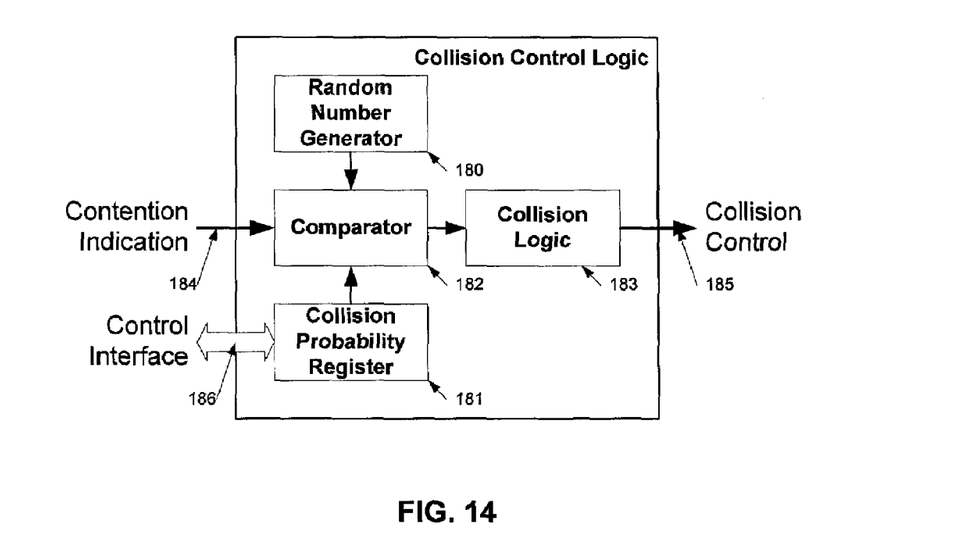
FIG. 14 shows an exemplary block diagram of the collision control logic in accordance with an embodiment of the present invention.

Turning now to FIG. 14, an exemplary schematic block diagram of the collision control logic is depicted. The collision control logic may include: a random number generator 180 that continuously sources random numbers on demand; a collision probability register 181 that may be configured with a per-interface collision probability by software running on the central controller via control interface 186; a comparator 182 activated by contention indication 184 received from client scheduler 41 (see FIG. 5), that may compare the random number from random number generator 180 and the pre-set collision probability from collision probability register 181 and supplies an equality signal to collision logic 183; and collision logic 183, which may process the comparator output and instruct MAC logic 40 (see FIG. 5) to interject a collision on the medium according to the rules of the MAC protocol.

During operation, when client scheduler 41 detects that 2 or more clients are contending for access to the medium, it may signal a contention indication to comparator 182, which may then take a random number from random number generator 180. If the random number is less than the value pre-set in collision probability register 181, a collision may be forced by collision logic 183; otherwise, no collision may be forced, and the MAC logic may simply transmit the packet indicated by client scheduler 41 without further ado. The value programmed into collision probability register may thus indicate the probability that a collision will actually be forced when a contention situation occurs. Forcing a collision may further involve transmitting a corrupted packet, possibly one with a valid frame body but an incorrect frame check sequence (FCS), to mimic the actual behavior of colliding stations as seen on the medium.

It is apparent that persons skilled in the art will be able to make use of the above general setup to emulate different types of traffic generation and test scenarios by simply adjusting the parameters of schedulers 41 and 44, collision control logic 51, and other elements of the multilevel packet scheduler described herein. For example, unfair or uneven access to the medium on the part of the clients may be emulated by setting different scheduling parameters—such as the interval and/or the priority—in the different contexts 43 in context memory 42 of client scheduler 41. Similarly, differential bandwidth or delay behaviors on the part of the traffic flows on the same or different clients may be emulated by setting different scheduling parameters for the contexts 46 in context memory 45 of flow scheduler 44.

Further, client scheduler 41 may provide different medium access protocol parameters (based on the specific client selected) to MAC logic 40 for use in executing the MAC algorithm in block 104 (see FIG. 10). This may enable the emulation of different types of clients attempting to access a single shared medium. For example, the commonly used IEEE 802.11b and IEEE 802.11g wireless LAN standards specify different timing parameters for medium access; it may thus be possible to emulate mixtures of IEEE 802.11b and IEEE 802.11g stations that are attempting to access and are contending for the same wireless channel.

In addition, the scheduling functionality provided by client scheduler 41 may be adapted to additionally support the interframe spacing (IFS) and backoff delays that may be required in between medium accesses by the same client; such delays are commonly mandated by MAC protocols such as IEEE 802.11. In this case, the deadline configured for specific emulated clients in the corresponding contexts 43 in context memory 42 of client scheduler 41 may be adjusted dynamically, under control of MAC logic 40, to interpose the desired interpacket spacing between transmissions of the same client. For example, the client scheduler may compare the minimum interpacket spacing mandated by the MAC protocol with the desired interpacket interval configured into the interval field of the context, and may choose the larger of the two, thus guaranteeing that the MAC protocol timing parameters are never violated.

The IEEE 802.11e-2005 QoS standard specifies, among other aspects, a prioritized medium access method for flows that are supported by the same or different clients. It will be readily apparent to persons skilled in the art that the emulation of such prioritized access by flows of different QoS characteristics may be performed simply by configuring the interval and priority fields of contexts 121 in scheduler context memory 120 belonging to the flow scheduler.

A traffic flow pause function may be implemented by start/stop control logic 47 in conjunction with client scheduler 41 and flow scheduler 44, to temporarily pause (and subsequently resume) traffic flows responsive to pause and unpause requests from the external central controller. Such pause/ unpause requests are commonly made as part of the connection setup and teardown process for clients implementing connection-oriented MAC protocols such as the IEEE 802.11 protocol. When a pause request is received from the central controller (possibly in response to a protocol disconnection handshake) for a specific client, start/stop control logic 47 may instruct client scheduler 41 to stop notifying flow scheduler 44 that it needs to select a flow for that client. The notification process may occur as in block 109 of FIG. 10. As a result, all test traffic flows for the client will be suspended, and only software-generated packets may be transmitted via software packet injection logic 48. Subsequently, a protocol connection or reconnection handshake may be performed to resume the paused client. Start/stop control logic 47 may then instruct client scheduler 41 to resume notifying flow scheduler 44 that it needs to select a flow or flows for that client, when that client is next scheduled.

During the testing of quality of service support by devices and systems, it may become necessary to measure the degree of congestion experienced by specific clients and/or traffic flows in terms of the medium access delay. One possible way of expressing medium access delay is the time between the expected transmission of a packet for the client or flow, and the actual transmission of that packet. The multilevel packet scheduler may simplify the measurement of medium access delay, as the desired transmission time of the packet is simply the deadline value in the contexts 121 in scheduler context memory 120. The actual transmission time of the packet is known at the point the packet is transmitted, and this is represented by the contents of real-time clock counter 124. Therefore, the medium access delay may be calculated very simply by subtracting the deadline value from real-time clock counter 124. This medium access delay may be reported to the user via the external central controller for each emulated client, thereby enabling the monitoring of medium access delays in the test system.

In another possible exemplary embodiment, and with further reference to FIG. 5, collision control logic 51 may be omitted, and contention between clients may be resolved internally to client scheduler 41, with the highest-priority packet having the earliest deadline being selected for transmission. This may enable the cost and complexity of the multilevel packet scheduler to be reduced, at the expense of collision support.

In another possible exemplary embodiment, transmit packet data buffers 49 may be omitted, and replaced with a frame generator that may automatically construct test data frames 'on the fly' for the different clients and flows being scheduled. Such a frame generator may accept parameters from flow scheduler 44 and client scheduler 41, and possibly also MAC logic 40, and generate the entire MAC frame and payload dynamically according to user-defined requirements. This may enable a reduction in memory size as well as a reduction in the amount of data that must be configured into the system prior to operation.

In another possible exemplary embodiment, software-generated packets that are created by software executed by the external central controller may be injected into the outgoing packet stream by writing them into the appropriate buffers in transmit packet data buffers 49. They may then be selected for transmit, and transmitted, in the normal course of operations, along with the remainder of the test traffic packets. This may enable the interleaving of software-generated packets and test traffic packets in a seamless manner, maintaining ordering.

It is apparent that the teachings of the present invention may enable an improved method for emulating the behavior of multiple stations or devices that generate data traffic that is multiplexed into a single channel or medium. It is further apparent that the teachings of the present invention may enable such emulation to be performed in a controllable and repeatable manner, as the operation of the multilevel packet scheduler may be controlled entirely by the parameters configured into it, and may therefore not be affected by external disturbances. It is yet further apparent that the teachings of the present invention may enable the emulation of large numbers of connection-oriented clients and/or flows with different QoS requirements and different medium access behaviors.

Accordingly, while this invention has been described with reference to illustrative embodiments, this description is not intended to be construed in a limiting sense. Various modifications of the illustrative embodiments, as well as other embodiments of this invention, will be apparent to persons skilled in the art upon reference to this description without departing from the scope of the invention, which is defined solely by the claims appended hereto.

What is claimed is:

1. A multilevel packet scheduler configured to generate digital test signals, the multilevel packet scheduler comprising:
   a first scheduler and a second scheduler, said first and second schedulers configured to work in concert to multiplex traffic on a packet-by-packet basis into a single traffic stream according to a hierarchy of stations and data flows;
   wherein said first scheduler is configured to select at a station level of said hierarchy based on a set of station-scheduling contexts stored in a first context memory;
   wherein said second scheduler, based on said selection by said first scheduler, is configured to select at a data flow level of said hierarchy based on a set of flow-scheduling contexts stored in a second context memory; and
   wherein said selection at said data flow level by said second scheduler indicates a specific packet to be transmitted within said single traffic stream.

2. A communications test system, comprising a plurality of said multilevel packet schedulers of claim 1, wherein said communications test system is configured to transmit a test data packet stream to a device under test (DUT), wherein each of said multilevel packet schedulers includes said first scheduler, configured to control an emulation of a medium access of a plurality of emulated test stations according to a medium access protocol, and further includes said second scheduler configured to control an emulation of a plurality of traffic flows supported by each of said emulated test stations according to a quality of service protocol.

3. The system of claim 2, wherein said first scheduler is an earliest-deadline-first scheduler.

4. The system of claim 3, wherein said second scheduler is an earliest-deadline-first scheduler.

5. The system of claim 3, wherein said system further comprises means for emulating contention between said emulated test stations by detecting when two or more of said emulated test stations have passed their deadlines according to said first scheduler.

6. The system of claim 2, wherein said second scheduler is an earliest-deadline-first scheduler.

7. The system of claim 2, wherein said first scheduler is further configured to use a plurality of priority levels, with each of said plurality of test stations being assigned a specific one of said plurality of priority levels.

8. The system of claim 2, wherein said second scheduler is further configured to use a plurality of priority levels, with each of said plurality of traffic flows being assigned a specific one of said plurality of priority levels.

9. The system of claim 8, wherein said second scheduler is further configured to emulate IEEE 802.11e prioritized access by said traffic flows.

10. The system of claim 2, wherein said first scheduler utilizes a constant-bandwidth scheduling algorithm.

11. The system of claim 2, wherein said second scheduler utilizes a constant-bandwidth scheduling algorithm.

12. The system of claim 2, wherein said first scheduler utilizes a constant-interval scheduling algorithm.

13. The system of claim 2, wherein said second scheduler utilizes a constant-interval scheduling algorithm.

14. The system of claim 2, wherein said first scheduler utilizes a constant-latency scheduling algorithm.

15. The system of claim 2, wherein said second scheduler utilizes a constant-latency scheduling algorithm.

16. The system of claim 2, wherein said system further includes a logic means for enabling an injection of packets into said test data packet stream under control of said first scheduler, wherein said packets are generated by software means.

17. The system of claim 2, wherein said first scheduler utilizes a linear search procedure.

18. The system of claim 2, wherein said second scheduler utilizes a linear search procedure.

19. The system of claim 2, wherein said first scheduler is further configured to emulate unfair access to the medium by the emulated test stations.

20. The system of claim 19, wherein said first scheduler is configured to emulate unfair access by using a plurality of different sets of scheduling parameters, with each of said plurality of test stations being assigned a specific one of said plurality of scheduling parameters.

21. The system of claim 2, wherein said second scheduler is further configured to emulate traffic flows with different types and natures of traffic.

22. The system of claim 21, wherein said second scheduler is configured to emulate different types of traffic by using a plurality of different sets of scheduling parameters, with each of said plurality of traffic flows being assigned a specific one of said plurality of scheduling parameters.

23. The system of claim 2, wherein said first scheduler is further configured to support variable backoff times for half-duplex MAC protocols.

24. The system of claim 23, wherein said first scheduler is further configured to support different MAC parameters for different clients.

25. The system of claim 2, wherein said multilevel packet scheduler further includes means for pausing of test traffic for a specific one of said emulated test stations when it is disconnected according to a MAC protocol.

26. The system of claim 25, wherein said multilevel packet scheduler further includes means for resuming of test traffic for a specific one of said emulated test stations when it is reconnected according to a MAC protocol.

27. The system of claim 2, wherein said system further comprises means for emulating contention between said emulated test stations.

28. The system of claim 27, wherein said system further comprises means for emulating on-air collisions arising from said emulation of contention.

29. The system of claim 28, wherein said system further comprises collision probability function logic.

30. The system of claim 29, wherein said collision probability function logic is configured to determine a level of collisions under software control.

31. The system of claim 27, wherein said emulating means detects when two or more of said emulated test stations are simultaneously active according to said first scheduler.

32. The system of claim 2, wherein said system is further configured to simultaneously start a subset of said traffic flows by concurrently activating multiple flow contexts in said second scheduler.

33. The system of claim 32, wherein said simultaneous start is accomplished by a group start command that is broadcast to all of said multilevel packet schedulers in said communications test system.

34. The system of claim 33, further comprising a flow group ID within each of said contexts for said flows, wherein said group start command also contains said flow group ID.

35. The system of claim 32, further comprising means for staggering starting times of individual flows in said subset of traffic flows.

36. The system of claim 35, further comprising means for controlling by a user delay between starting times of said individual flows.

37. The system of claim 2, wherein said system is further configured to simultaneously start a subset of said emulated test stations by concurrently activating multiple station contexts in said first scheduler.

38. The system of claim 37, wherein said simultaneous start is accomplished by a group start command that is broadcast to all of said multilevel packet schedulers in said communications test system.

39. The system of claim 38, further comprising a station group ID within each of said contexts for said stations, wherein said group start command also contains said station group ID.

40. The system of claim 37, further comprising means for staggering starting times of individual stations in said subset of stations.

41. The system of claim 40, further comprising means for controlling by a user delay between starting times of said individual stations.

42. The system of claim 2, further comprising means for simultaneously stopping a subset of said traffic flows by concurrently deactivating multiple flow contexts in said second scheduler.

43. The system of claim 2, further comprising means for simultaneously stopping a subset of said emulated test stations by concurrently deactivating multiple station contexts in said first scheduler.

44. The system of claim 2, further comprising means for monitoring medium access delays by said emulated test stations.

45. The system of claim 44, wherein said monitoring means subtracts desired scheduled times of said emulated test stations from actual transmission times of said emulated test stations and interprets the differences as said medium access delays.

46. The system of claim 2, wherein said first scheduler is configured to emulate collisions between said plurality of emulated test stations.

47. A method of providing packetized digital communication test signals, the method comprising:
  selecting, from a plurality of emulated test stations, a subset of emulated test stations to provide medium access according to a medium access protocol;
  selecting, from a plurality of traffic flows associated with said subset of emulated test stations, a subset of traffic flows to provide one or more packets for transmission;

transmitting the communication test signals based on the selecting of the emulated test stations and the selecting of the traffic flows;

wherein the selection of emulated test stations and the selection of traffic flows is based on a hierarchy of station-scheduling contexts and flow-scheduling contexts; and wherein the selection of emulated test stations and the selection of traffic flows are performed on a packet-by-packet basis.

48. The method of claim 47, further comprising:
providing one or more client contexts corresponding to the emulated test stations;
providing one or more flow contexts corresponding to the traffic flows; and
associating the flow contexts to the client contexts.

49. The method of claim 47, wherein the communication test signals comprise packet traffic multiplexed according to the hierarchy of the emulated test stations and the traffic flows, with the selecting for the emulated test stations and the traffic flows at a given level of the hierarchy used for selecting among a subset of the contexts at a next successive level of the hierarchy.

50. The method of claim 47, wherein the selecting emulated test stations and/or the selecting traffic flows is based on an earliest-deadline-first scheduling algorithm.

51. The method of claim 47, wherein the selecting emulated test stations and/or the selecting traffic flows is based on a plurality of priority levels.

52. The method of claim 47, wherein the selecting emulated test stations and/or the selecting traffic flows is based on a constant-bandwidth scheduling algorithm.

53. The method of claim 47, wherein the selecting emulated test stations and/or the selecting traffic flows is based on a constant-interval scheduling algorithm.

54. The method of claim 47, wherein the selecting emulated test stations and/or the selecting traffic flows is based on a constant-latency scheduling algorithm.

55. The method of claim 47, further comprising:
receiving packets for transmission; and
transmitting the packets, under control of the selecting for the emulated test stations, as part of the communication test signals.

56. The method of claim 47, wherein the selecting emulated test stations and/or the selecting traffic flows is based on a linear search scheduling algorithm.

57. The method of claim 47, further comprising emulating unfair access to the medium by the emulated test stations based on scheduling parameters associated with the emulated test stations.

58. The method of claim 47, further comprising emulating different types and natures of traffic for the traffic flows, wherein the emulating of different types is based on scheduling parameters associated with the traffic flows.

59. The method of claim 47, wherein the selecting emulated test stations further comprises supporting variable back-off times for half-duplex MAC protocols and supporting different MAC parameters for different ones of the emulated test stations.

60. The method of claim 47, further comprising:
pausing the communication test signals for one or more of the emulated test stations if it is disconnected based on a MAC protocol; and
resuming the communication test signals for one or more of the emulated test stations if it is reconnected based on the MAC protocol.

61. The method of claim 47, further comprising:
emulating contention between the emulated test stations; and
emulating on-air collisions arising from the emulation of contention.

62. The method of claim 61, further comprising determining a level of collisions based on a collision probability function.

63. The method of claim 47, wherein the selecting of traffic flows is based on IEEE 802.11e prioritized access for the traffic flows.

64. The method of claim 47, further comprising starting simultaneously a subset of the traffic flows by concurrently activating multiple flow contexts, wherein the starting is based on a group start command comprising a flow group ID.

65. The method of claim 64, further comprising staggering start times of the traffic flows in the subset of the traffic flows.

66. The method of claim 65, further comprising controlling by a user a delay between the start times of the traffic flows in the subset of the traffic flows.

67. The method of claim 47, further comprising starting simultaneously a subset of the emulated test stations by concurrently activating multiple station contexts, wherein the starting is based on a group start command comprising a station group ID.

68. The method of claim 67, further comprising staggering start times of the emulated test stations in the subset of the emulated test stations.

69. The method of claim 68, further comprising controlling by a user a delay between the start times of the emulated test stations in the subset of the emulated test stations.

70. The method of claim 47, further comprising stopping simultaneously a subset of the traffic flows by concurrently deactivating multiple flow contexts.

71. The method of claim 47, further comprising stopping simultaneously a subset of the emulated test stations by concurrently deactivating multiple station contexts.

72. The method of claim 47, further comprising monitoring medium access delays for the emulated test stations based on desired scheduled times of the emulated test stations relative to actual transmission times of the emulated test stations.

* * * * *